US011101091B2

(12) United States Patent
Weidenmüller et al.

(10) Patent No.: US 11,101,091 B2
(45) Date of Patent: Aug. 24, 2021

(54) MODULAR SAFETY RELAY CIRCUIT FOR THE SAFE SWITCHING ON AND/OR OFF OF AT LEAST ONE MACHINE

(71) Applicant: SICK AG, Waldkirch (DE)

(72) Inventors: Jonas Weidenmüller, Waldkirch (DE); Franz Dold, Waldkirch (DE); Frederik Behre, Waldkirch (DE)

(73) Assignee: SICK AG, Waldkirch (DE)

( * ) Notice: Subject to any disclaimer, the term of this patent is extended or adjusted under 35 U.S.C. 154(b) by 347 days.

(21) Appl. No.: 15/974,794

(22) Filed: May 9, 2018

(65) Prior Publication Data

US 2018/0350541 A1 Dec. 6, 2018

(30) Foreign Application Priority Data

Jun. 2, 2017 (EP) .................................... 17174254

(51) Int. Cl.
*H01H 47/00* (2006.01)
*G05B 9/02* (2006.01)
*G05B 19/048* (2006.01)

(52) U.S. Cl.
CPC ............ *H01H 47/004* (2013.01); *G05B 9/02* (2013.01); *G05B 19/048* (2013.01)

(58) Field of Classification Search
CPC ...... H01H 47/004; G05B 9/02; G05B 19/048; G05B 9/03
USPC .......................................................... 307/326
See application file for complete search history.

(56) References Cited

U.S. PATENT DOCUMENTS

| | | | | |
|---|---|---|---|---|
| 4,354,215 A | * | 10/1982 | van der Scheer | H02H 3/025 361/63 |
| 6,809,911 B2 | * | 10/2004 | Dickhoff | H01H 47/005 361/115 |
| 7,196,434 B2 | * | 3/2007 | Zhou | H01H 9/563 307/131 |
| 9,726,726 B2 | * | 8/2017 | Bock | G01R 31/44 |
| 9,852,852 B2 | * | 12/2017 | Le | H01H 47/004 |
| 2003/0090847 A1 | * | 5/2003 | Hiraku | H01H 47/004 361/86 |

(Continued)

FOREIGN PATENT DOCUMENTS

DE 19956698 C1 9/2001
DE 102004033359 A1 2/2006

OTHER PUBLICATIONS

European Search Report dated Nov. 27, 2017 in corresponding European Patent Application No. 17174254.7.

*Primary Examiner* — Michael R. Fin
(74) *Attorney, Agent, or Firm* — Nath, Goldberg & Meyer; Jerald L. Meyer

(57) ABSTRACT

To enable an increase in a service life of a modular safety relay circuit, a modular safety relay circuit is provided for the safe switching on and/or off of at least one machine comprising at least one relay module to which the at least one machine is connected, wherein the relay module comprises at least two relay contacts that are connected in series and that can be brought from a first position into a second position and vice versa; and wherein one relay contact switches in advance by a delay of the other relay contact; and a control unit controlling the relay contacts that alternatingly controls the relay contacts in accordance with a state detection of the relay contacts with the delay.

6 Claims, 1 Drawing Sheet

(56) References Cited

U.S. PATENT DOCUMENTS

| | | | |
|---|---|---|---|
| 2006/0158794 A1* | 7/2006 | Behringer | H01H 47/004 361/1 |
| 2006/0274459 A1* | 12/2006 | Zhou | H01H 9/563 361/23 |
| 2010/0039741 A1* | 2/2010 | Booth | H02H 1/0061 361/63 |
| 2015/0015089 A1* | 1/2015 | Le | H01H 47/004 307/125 |

* cited by examiner

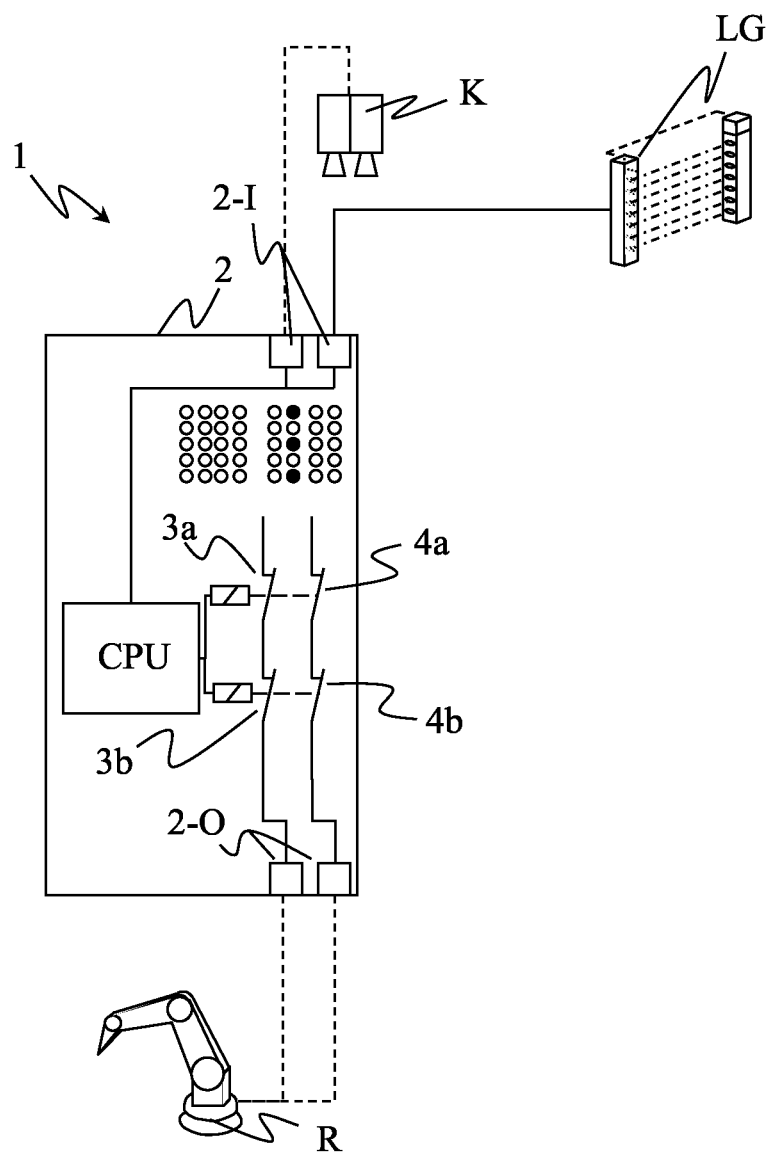

MODULAR SAFETY RELAY CIRCUIT FOR THE SAFE SWITCHING ON AND/OR OFF OF AT LEAST ONE MACHINE

FIELD

The invention relates to a modular safety relay circuit for the safe switching on and/or off of at least one machine.

BACKGROUND

In today's automation industry, a total plant is autonomously controlled by at least one safety control such that the machine carries out the work assigned to it and optionally interacts with another machine. In this respect, the total plant has to have a sufficient safety level against possible injury to persons or against a failure of the total system despite a high degree of automation and accordingly has to satisfy the specifications of the standard EN ISO 13849, for example.

To satisfy the high safety specifications, an environment of the machine, a position and/or a movement of the machine are monitored by means of sensors, for example, with the safety control actuating at least one safety relay unit circuit that switches the machine off on an unintended operating state.

The safety relay circuit is generally known and has at least one relay module having input terminals and output terminals. The safety relay circuit receives input signals at the input terminals, with the input signals being provided by at least one connected signal transmitter and with output signals being communicated to the at least one machine connected to the relay module via the output terminals, with the output signals being prepared by a control unit of the safety relay circuit in dependence on the input signals.

In other words, using the input signals of the connected signal transmitter, the relay module is able to safely switch the connected machine off and also to switch it back on. For this purpose, the relay module comprises relay contacts upstream of its output terminals, said relay contacts being activated to close or to open by means of a control winding, for example.

In this respect, one relay contact is usually loaded more than another relay contact of the relay module so that this more strongly loaded relay contact theoretically determines a service life of the entire relay module.

SUMMARY

It is therefore an object of the invention to provide a modular safety relay circuit for the secure switching on and/or off of at least one machine with which an increase in the service life of the relay module is possible.

The object is satisfied in accordance with the invention by a modular safety relay circuit for the safe switching on and/or off of at least one machine having at least one relay module to which the at least one machine is connected, wherein the relay module comprises at least two relay contacts that are connected in series and that can be brought from a first position into a second position and vice versa, and wherein a relay contact switches in advance due to a delay of the other relay contact and having a control unit that controls the relay contacts and that alternatingly controls the relay contacts with the delay in accordance with a state detection of the relay contacts.

The advantage hereby results that the relay contacts are uniformly worn so that a maximum possible number of switching procedures of the relay module can be increased.

In accordance with a preferred embodiment, the relay contacts are closed in the first position and the relay contacts are open in the second position or the relay contacts are open in the first position and the relay contacts are closed in the second position. The control unit furthermore advantageously comprises a logic module that carries out the delay on the switching of the relay contact controlled with a delay. A setting of the delay can hereby be changed in a very simple manner.

In accordance with a further preferred embodiment, the delay of the switching is in the single-figure millisecond range on a transition of the relay contacts from the first position into the second position. The relay module thus still has a safe response behavior even though the relay contacts are switched in a controlled delayed manner.

In accordance with a further preferred embodiment, the delay of the switching is in the two-figure to three-figure millisecond range on a transition of the relay contacts from the second position into the first position since a switching procedure of the machine is less time-critical than a switching off thereof.

In accordance with a further preferred embodiment, the state detection for changing the relay contact with the delay comprises a number of actuated switching cycles of the relay contacts. The control unit can monitor and control the wear of the relay contacts fully automatically in this manner.

In accordance with a further preferred embodiment, the delay can be switched on or off manually by an operator, whereby the operator can very easily choose between a high response time, namely the switching off of the delay, or a longer service life, namely switching on the delay, of the relay module or of its relay contacts.

BRIEF DESCRIPTION OF THE DRAWINGS

The invention will also be explained in the following with respect to further advantages and features with reference to the enclosed drawing and to embodiments. The Figure of the drawing show in:

FIG. 1 a schematic representation of a modular safety relay circuit in accordance with the invention in an automation plant.

DETAILED DESCRIPTION

FIG. 1 schematically shows an automation plant that comprises a modular safety relay circuit 1 in accordance with the invention to which a machine is connected. The safety relay circuit 1 switches a load circuit on or off that supplies the machine, shown by way of example as a robot arm R, with energy. The switching on and off of the machine can here by carried out safely or only a safe switching on or only a safe switching off so that different application cases can be satisfied by the safety relay circuit 1.

The safety relay circuit 1 shown comprises a relay module 2 that has input terminals 2-I and output terminals 2-O, with a camera K and a light grid LG, for example, being able to be connected as signal transmitters to the input terminals 2-I. The robot arm R is connected to the output terminal 2-O so that the relay module 2 can switch a power supply to the robot arm R off or on in dependence on the signals of the camera K or of the light grid LG.

The signals of the signal transmitter are supplied to a control unit CPU that evaluates the signals. The control unit CPU generates corresponding control signals with reference to the evaluation to safely control the robot arm R. This means, for example in the event that a protected field of the light grid LG is interrupted, the control unit CPU generates a corresponding control signal to disconnect the robot arm R from the power supply. If the protected field of the light grid LG remains interrupted, the control unit CPU does not permit any switching back on of the robot arm R.

For this purpose, the relay module 2 comprises in accordance with the invention at least two relay contacts 3a, 3b and 4a, 4b that are connected in series and that can be brought from a first position into a second position and vice versa. By way of example, the relay contacts 3a, 3b and 4a, 4b are closed in the first position and are open in the second position. In the first, closed position of the relay contacts 3a, 3b and 4a, 4b, the robot arm R is connected to the power supply at the output terminals 2-O of the relay module 2 and in the second, open position of the relay contacts 3a, 3b and 4a, 4b the robot arm R is disconnected from the power supply.

This example can also be configured in the opposite manner depending on the application case required. This means that with a required disconnection of the robot arm R from the power supply in the base state, the relay contacts 3a, 3b and 4a, 4b are open in the first position and are closed in the second position.

The control unit CPU that can be a computer processor moves both relay contacts 3a and 3b or 4a and 4b connected in series from the closed position into the open position or also conversely in dependence on the signals of the signal transmitter, with the robot arm R also being reliably controlled when one of the two relay contacts 3a or 3b or 4a or 4b connected in series has a malfunction in the form, for example, of a welding of the relay contacts 3a or 3b or 4a or 4b.

In the embodiment shown, bot output terminals 2-O of the relay module 2 have to be connected to the power supply so that the robot arm R can move into operation. If one of the two relay contacts 3a, 3b and 4a, 4b is not closed, the robot arm R remains out of operation. This means that with the shown wiring of the relay module 2, a safe control of the robot arm R is achieved in a two-channel redundant manner.

In accordance with the invention, one of the two relay contacts 3a or 4a connected in series switches in advance by a delay of a switching of the other relay contact 3b or 4b connected in series, with the control unit CPU controlling the relay contacts 3a, 3b and 4a, 4b determining a state of the relay contacts 3a, 3b and 4a, 4b and alternatingly controlling the relay contacts 3a or 3b and 4a or 4b with the delay in accordance with a state detection or the detected state of the relay contacts 3a, 3b and 4a, 4b. "In advance" is understood such that one of the relay contacts 3a or 3b and 4a or 4b connected in series always switches before the other relay contact 3b or 3a and 4b or 4a.

In other words and with respect to the embodiment in FIG. 1, the control unit CPU controls the relay contacts 3b or 4 located closer to the output terminals 2-O with the delay so that the relay contacts 3a or 4a located further from the output terminals 2-O switch before the respective relay contacts 3b or 4b controlled with the delay. The control unit CPU in so doing detects the state of the relay contacts 3a, 3 and 4a, 4b and changes the control of the relay contacts 3b or 4b with the delay in accordance with the state of the relay contacts 3a, 3b and 4a, 4b such that the relay contacts 3a or 4a switched in advance up to then switch after the relay contacts 3b or 4b switched with a delay up to then.

This means the relay contacts 3a or 4a switched in advance are controlled with the delay by the control unit CPU such that the relay contacts 3b or 4b connected with the delay up to then are now switched in advance. After a repeat detection of the state of the relay contacts 3a, 3b and 4a, 4b, the control unit CPU again changes the control with the delay in the relay contacts 3a, 3b and 4a, 4b, whereby a uniform wear of the relay contacts 3a, 3b and 4a, 4b can be ensured to extend the service life of the relay module 2 or of the modular safety relay circuit 1.

The control unit CPU in this respect preferably comprises a logic module that performs the delay on the switching of the relay contacts 3b or 4b connected in series. The logic module enables a fast and simple adaptation of the control unit CPU as required to optionally change the alternating control of the relay contacts 3a, 3b and 4a, 4b with the delay in accordance with the state detection of the relay contacts 3a, 3b and 4a, 4b.

The detection of the state of the relay contacts 3a or 3b or 4a or 4b, for example, comprises a number of actuated switching cycles of the relay contacts 3a or 3b or 4a or 4b to change an order of the relay contacts 3a or 3b or 4a or 4b controlled with the delay. This means that after X actuated switching cycles, where X is a natural number, the relay contacts 3a or 4a are controlled with the delay instead of the relay contacts 3b or 4b controlled with the delay up to then. After a further Y actuated switching cycles, where Y is a natural number, the control unit CPU again changes the order of the relay contacts 3b or 4b controlled with the delay.

The natural number Y of the actuated switching cycles of the relay contacts 3a, 3b and 4a, 4b can be the same as or smaller than the natural number X of the actuated switching cycles of the relay contacts 3a 3b and 4a, 4b at the start of operation of the relay module 2 or of the safety relay circuit 1 depending on the operating time period of the relay module 2 or of the safety relay circuit 1. A time period between the changing of the delayed control of the delayed control of the relay contacts 3a, 3b and 4a, 4b can hereby be shortened in accordance with the previous operating time period so that a wear of the relay contacts 3a, 3b and 4a, 4b by the operating duration can also be taken into account in the alternating change of the delayed control of the relay contacts 3a, 3b and 4a, 4b. This results in increased security against a failure of the relay module 2 or of the safety relay circuit 1.

The delay of the switching of the relay contacts 3a or 3b or 4a or 4b is in particular in the single-figure millisecond range, preferably 1 to 5 milliseconds, on a transition of the relay contacts 3a, 3b and 4a, 4b from the first, closed position into the second, open position. This means that on the switch-off procedure of the robot arm R, a fast switching of the relay contacts 3a, 3b and 4a, 4b is relevant to safety so that the delayed control of one of the two relay contacts 3a, 3b and 4a, 4b connected in series may not effect any relevant increase of a response behavior of the relay module 2 or of the safety relay circuit 1.

On a transition of the relay contacts 3a, 3b and 4a, 4b from the second, open position into the first, closed position, the delay of the switching of the relay contacts 3a, 3b and 4a, 4b is in the two-figure to three-figure millisecond range, preferably in the range of several 100 milliseconds. This means that the switch-on procedure of the robot arm R is less time critical so that the delayed control of one of the two relay contacts 3a, 3b and 4a, 4b connected in series can effect an increased response behavior of the relay module 2 or of the safety relay circuit 1.

The logic module of the control unit CPU furthermore makes it possible for an operator to manually switch the delay of the switching of the relay contacts 3a, 3b and 4a, 4b on or off. The operator can achieve an improved, uniform wear of the relay contacts 3a, 3b and 4a, 4b and thus an increase in the service life of the relay module 2 or of the safety relay circuit 1 by the switching on of the delay of the switching of the relay contacts 3a, 3b and 4a, 4b. If, however, a high, unchanged response behavior of the relay module 2 or of the safety relay circuit 1 is required for safety reasons, the operator can switch off the delay of the switching of the relay contacts 3a, 3b and 4a, 4b or can leave it inactivated.

REFERENCE NUMERAL LIST 1 modular safety relay circuit
2 relay module
2-I input terminal of the relay module
2-O output terminal of the relay module
3a, 3b, 4a, 4b relay contacts
CPU control unit
K camera
LG light grid
R robot arm

The invention claimed is:

1. A modular safety relay circuit for the safe switching on and/or off of at least one machine, the modular safety relay circuit comprising:
at least one relay module to which the at least one machine is connected,
wherein the at least one relay module comprises at least two relay contacts, with the at least two relay contacts being connected in series and with the at least two relay contacts being able to be brought from a first position into a second position and vice versa;
wherein one relay contact switches in advance by a delay of the other relay contact; and a control unit controlling the at least two relay contacts that alternatingly controls the relay contacts with the delay in accordance with a state detection of the relay contacts;
and wherein an order of the relay contacts controlled with the delay changes depending on a number of actuated switching cycles of the relay contacts.

2. The modular safety relay circuit in accordance with claim 1, wherein the relay contacts are closed in the first position and the relay contacts are open in the second position or the relay contacts are open in the first position and the relay contacts are closed in the second position.

3. The modular safety relay circuit in accordance with claim 1, wherein the control unit comprises a logic module that carries out the delay on the switching of the relay contact controlled with a delay.

4. The modular safety relay circuit in accordance with claim 1, wherein, on a transition of the relay contacts from the first position into the second position, the delay of the switching is in the single-figure millisecond range.

5. The modular safety relay circuit in accordance with claim 1, wherein, on a transition of the relay contacts from the second position into the first position, the delay of the switching is in the two to three-figure millisecond range.

6. The modular safety relay circuit in accordance with claim 1, wherein the delay can be manually switched on or off by an operator.

* * * * *